Nov. 23, 1965  T. F. ZLOTEK  3,219,163
SPRAG AND RETAINER STRUCTURE
Filed June 24, 1963  2 Sheets-Sheet 1
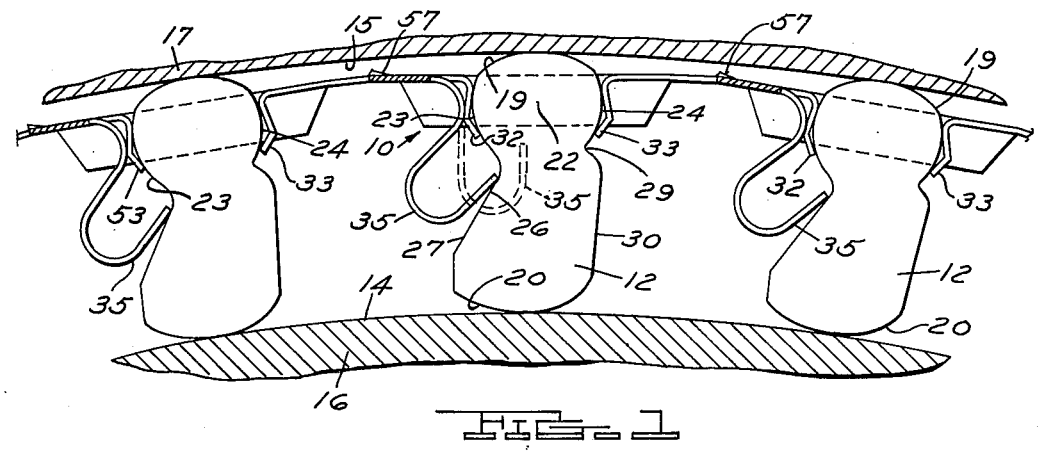
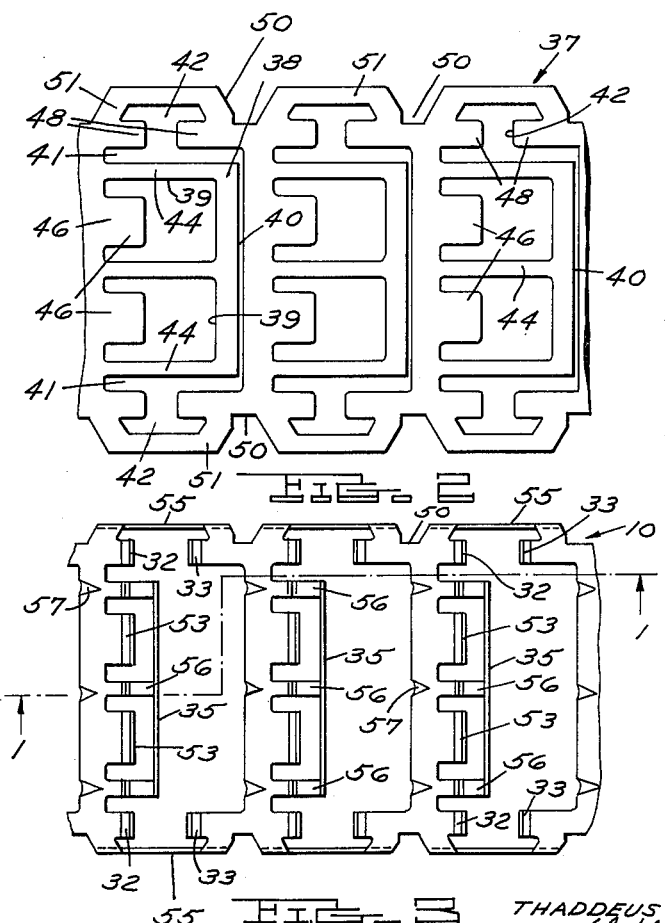
INVENTOR.
THADDEUS F. ZLOTEK
BY
ATTORNEYS Nov. 23, 1965     T. F. ZLOTEK     3,219,163
SPRAG AND RETAINER STRUCTURE
Filed June 24, 1963     2 Sheets-Sheet 2
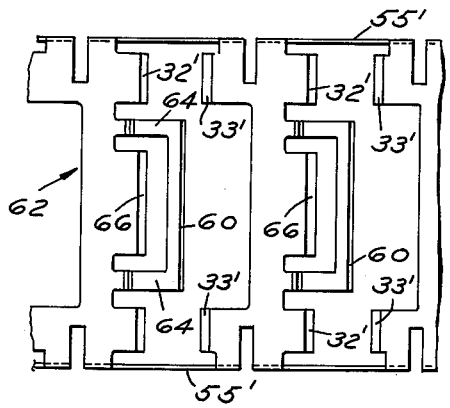
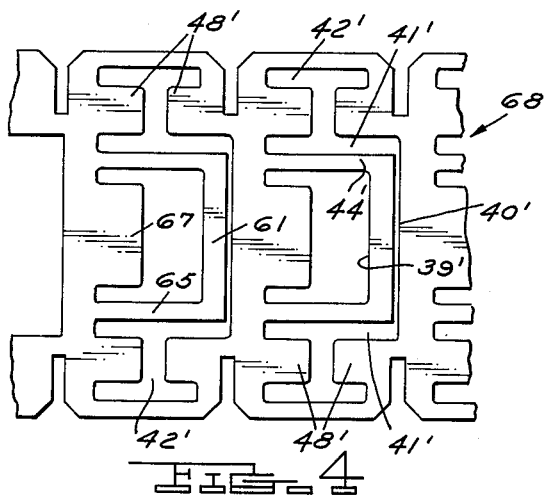
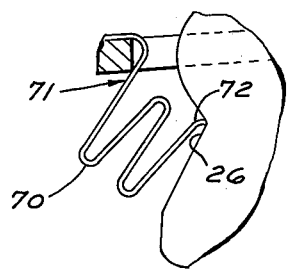
INVENTOR.
THADDEUS F. ZLOTEK
BY
ATTORNEYS

United States Patent Office 3,219,163
Patented Nov. 23, 1965

3,219,163
SPRAG AND RETAINER STRUCTURE
Thaddeus F. Zlotek, Center Line, Mich., assignor to Form-sprag Company, Warren, Mich., a corporation of Michigan
Filed June 24, 1963, Ser. No. 289,951
4 Claims. (Cl. 192—45.1)

The present invention relates to improvements in a sprag and retainer structure for overrunning or like sprag clutches, or comparable force transmitting devices.

It is an object of the invention to provide a sprag retainer and biasing or energizing structure which, for a given size and number of sprags, enables the clutch to have a greater load bearing capacity than heretofore possible; and which, because of manufacturing economies made possible by the improvement, both in regard to the sprags and the retainer and biasing features, enables the clutch to be produced at a considerably lesser cost than existing conventional assemblies.

More specifically, it is an object of the invention to provide a sprag and retainer assembly or structure featuring a circumferential series of sprags retained in predetermined spacing by improved light gauge metal retainer means having the additional functions of energizing the respective sprags in relation to opposed coaxial races. The spring metal spacing and energizing means also afford bearing portions against which opposed cylindrical surfaces of a portion of the sprag may engage to maintain a proper transverse alignment of the several sprags as they tilt to and from wedging or clutching engagement with the races. The sprags are individually energized.

In accordance with this object, the improvements in regard to the energizing and bearing retainer provisions enable the use of sprags free of such special notched formations as are commonly employed to receive energizing spring means for the sprags. This signifies that each sprag has greater load bearing capacity, since metal has not been removed therefrom in notching; that a sprag possessing a given volume of metal may be produced in more compact dimensions than an unnotched one and still sustain a comparable load; and that the cost of production of the sprags is substantially reduced due to elimination of the need for a notching operation.

Another object is to provide a sprag and retainer structure or assembly, in which the retainer means is very readily and inexpensively produced of a length of relatively thin gauge of appropriate flexible stock, such as a non-rust stainless steel, with bearing and biasing provisions for the sprags integrally built into such means.

A still further object is to provide a sprag and retainer structure or assembly, in which the retainer means is fabricated from a single elongated length of thin flexible stock, united by welding or otherwise at its ends to afford a desirable annular retainer outline.

The retainer means is characterized by bearing fingers or lips adapted to engage against rounded bearing surfaces of a sprag adjacent either axial end of the latter, along with bent spring fingers adapted to engage the body of the sprag in both axially and radially spaced relation to such bearing elements for the purpose of energizing or biasing the respective sprags. Such energizing or biasing fingers or portions of the retainer means may have individually different forms, but in common are characterized by a bent, elastic bight-like element projecting radially from the annular body of retainer and terminating in a lip portion having the desired biasing action on the sprag in its axially central zone.

Another general object is to provide spring type sprag bearing and energizing means for a sprag clutch which avoids the need for relatively expensive machining of retainer ring means. Thus, a suitable retainer ring to mount the sprags simply takes the form of a strip of thin resilient metal stamped or punched to provide the necessary sprag receiving openings and the baring and biasing means referred to, and rolled up and welded at its ends in an annular form.

The foregoing as well as other objects will become more apparent as this description proceeds, especially when considered in connection with the accompanying drawings illustrating the invention, wherein:

FIG. 1 is a fragmentary view, in enlarged scale, in end elevation of a sprag and retainer structure according to one embodiment of the invention, as disposed between coaxial cylindrical race surfaces, the race members being shown in transverse section and the retainer being shown sectioned on a line corresponding to line 1—1 of FIG. 3;

FIG. 2 is a fragmentary plan view showing a portion of a flat, thin spring steel blank strip from which the retainer is fabricated by a bending procedure;

FIG. 3 is a fragmentary plan view illustrating a portion of the retainer following the bending and forming operation thereon;

FIGS. 4 and 5 are fragmentary plan views similar to FIGS. 2 and 3, respectively, illustrating alternative embodiments of blank and finished retainer design, differing primarily from the embodiment of FIGS. 1, 2 and 3 in that a biasing spring portion of the retainer is of two-armed, rather than three-armed character; and FIG. 6 is a fragmentary, radially sectioned view showing a portion of a modified version of the spring retainer, in which the re-entrant tongue portion thereof is W-shaped, rather than U-shaped in sectional outline, as in FIG. 1.

FIGS. 1 and 3 of the drawings illustrate one embodiment of a retainer, generally designated 10, adapted to be assembled in the manner of FIG. 1 with a circumferential series of sprags 12 and disposed between the cylindrical race surfaces 14, 15 of a pair of coaxial inner and outer races 16, 17, respectively.

Each sprag 12 is characterized by an outer cam or wedging surface 19 defined by an arc suitably centered in the body of the sprag and adapted for wedging or sliding engagement with the surface 15 of outer race 17, and by an inner cam or wedging surface 20, tiltable into and out of wedging engagement with the surface 14 of inner race 16. Particular details in regard to the generation of the respective cam or wedging surfaces 19 and 20 constitute no part of the present invention; and it may be asssumed that they are conventional in this respect, the action of the sprags being, as viewed in FIG. 1, to individually tilt counterclockwise for wedging engagement with the race surface 14, under energizing or biasing effort exerted by retainer 10, or to tilt clockwise against the energizing force, in the overrunning phase of operation of the clutch of which the retainer and sprag structure is a component.

It will be noted by reference to FIG. 1, and other figures to be described, that the sprags 12 are unpierced and plain-surfaced at their upright axial ends, lacking both the usual intermediate holes or the grooves or notches formed in such ends for the reception of garter-type energizing spring means. This has, as indicated above, the effect of reducing the production costs of the sprag, and of increasing their individual load carrying capacity, thus enabling the sprags to be made more compact without diminution of load bearing ability, as compared with a notched type sprag.

Otherwise, and as illustrated in FIG. 1, the sprag is formed about a center designated 22 to provide a pair of outwardly convex cylindrical bearing surfaces 23, 24 merging at their outer extremities with ends of the cam or wedging surface 19. The bearing surface 23 continues radially inwardly to mergence with a re-entrant arcuate waist formation or portion 26, whence the axially extending side surface of the sprag proceeds radially inwardly in a planar surface at 27 to junction with one end of the inner wedging surface 20.

On the opposite circumferentially facing side of the sprag, the bearing surface 24 rounds radially and inwardly to a relatively sharply notched re-entrant portion at 29, whence it shoulders outwardly then proceeds along a generally radial plane 30 to junction with an extremity of wedging surface 20.

As clearly indicated in FIG. 1, the bearing surfaces 23, 24 have journalled engagemnet in small fingers or prongs 32, 33, respectively, formed on the retainer 10 in a manner to be described; and the planar sprag surface 27 is adapted to have engagement just radially inwardly of the re-entrant formation 26 with a re-entrant or U-shaped sping tongue member or portion 35 of the retainer, as will also be described.

Now referring to FIG. 2, this illustrates a portion of an elongated blank, designated by the reference numeral 37, which is fabricated of thin spring metal stock, for example a strip of 18–8 stainless steel of, say .003″ to .007″ thickness or gauge. A strip of this character is blanked symmetrically with respect to a horizontal center line in FIG. 2 to provide a central spring-constituting tongue portion 38, generally in the outline of a reverse E, by excising portions on either side of the center line to provide openings 39 which are generally in the shape of a laterally opening U, with the tongue portion 38 separated from an adjoining portion of the strip stock at a transversely elongated blanked out slot 40. This slot has lateral extensions 41 at its end extremities, from which branch blanked out openings 42 in the general outline of a T.

It is seen that the blank is thus characterized by a major tongue portion 38, which is intended to provide the re-entrant, U-shaped spring member or portion 35 (FIG. 1) of retainer 10, this tongue portion being connected to the remainder of the blank by three parallel and transversely spaced arms 44; by a pair of minor tongue portions 46 projecting into the spaces 39 on either side of the central arm portion 44; and by pairs of fingers 48 on opposite transverse sides of the respective slot extensions 41, which are intended to provide the bearing fingers or elements 32, 33 (FIG. 1). In addition, the blank is formed by notching the same at 50 in transverse alignment with the slot 40, so as to provide wing formations 51 along the sides of the blank 37, for a purpose to be described, these wing portions externally surrounding the blanked out T-openings.

The finished retainer 10 made from the blank 37 of FIG. 2 is illustrated in FIGS. 1 and 3. In this bending and forming operation, the blanked tongue 38 and its component parallel arms 44 are bent radially inwardly (FIG. 1) and down into a generally U-shaped outline, such as will occupy initially and in an unstressed condition the position illustrated in dotted line in FIG. 1.

The elements 48 of blank 37 are bent radially inwardly to provide the respective bearing fingers 32, 33; and the minor tongue portions or elements 46 are similarly bent in transverse alignment with the bearing elements 32 to provide further bearing elements 53 which, with the sprags 12 assembled to retainer 10, have bearing engagement with the cylindrical bearing surface 23 of the respective sprags, thus supplementing in this action the bearing function of the fingers 32 opposed to the bent fingers 33. Outwardly of the fingers 32, the wings 51 of the sprag are bent radially inwardly to provide lateral restraining bars 55, located outwardly of axial ends of the sprags 12 when the assembly of sprags and retainer is completed.

The three-arm portions of the spring tongue member 35 are designated 56; and the retainer 10 is provided with dimples or nibs 57 in alignment with these arm portions.

As thus constituted, a suitable length of the formed strip of retainer 10 is united at its ends to form an annulus of the desired diameter, i.e., to bring the bearing portions 32, 33, 53 in proper position for bearing engagement with the sprag surfaces 23, 24, and the spring tongue member 35 in position for spring camming and energizing engagement with the flat sprag surface 27 radially inwardly of the re-entrant formation 26. Union of the strip at its ends is preferably by spot welding in the general zones of the dimples or nibs 57. The sprags 12 are then inserted in place in the circumferentially spaced openings between the bearing elements 32, 33, with the bearing tongue elements 53 in corresponding bearing engagement at one side and the spring tongue portion 35 in energizing engagement as described; upon which the completed retainer and sprag structure is inserted in the sprag and retainer space between race surfaces 14, 15.

FIGS. 4 and 5 of the drawings illustrate an alternative embodiment of FIGS. 1, 2 and 3 in that there is but a single major spring tongue portion 60, bent from the C-shape tongue 61 of the blank (FIG. 4) and joined to the remainder of the retainer specially designated 62, by two parallel spring arms 64, which are bent from end extremities 65 of the blank tongue 61. There is likewise but a single intermediate bearing tongue or element 66 between these spring arms 64, being bent from a tongue formation 67 of the blank of FIG. 4, which is generally designated by the reference numeral 68. Otherwise, the blank 68 and finished retainer strip 62 are in the main identical with the blank and retainer of the first embodiment– so that corresponding parts of the two embodiments will be designated by corresponding reference numerals primed, and further description will be dispensed with.

FIG. 6 of the drawings illustrates a fragment of a further modified sprag and retainer arrangement, differing only from those of FIGS. 1–3 and FIG. 4 and 5 in that the re-entrant forward spring member 70 of the spring retainer, generally designated 71 and otherwise similar to those of either of the previous embodiments, is of W-shaped cross sectional outline for additional resiliency, rather than of U-shaped re-entrant outline, and terminates in a forwardly disposed lip 72 engageable with the waist formation 26 of the sprag 12. In other respects, the retainer 71 will resemble those of the earlier described embodiments in both structure and function, so that further description of the form of FIG. 6 is superfluous.

The retainer structure has, in any embodiment, the advantages of slight cost of manufacture and ready adaptability to any specific design to meet the needs of a particular clutch assembly. The need to aperture or recess the sprags to receive biasing or energizing means is avoided, with consequent reduction in the cost of sprag production and increase in the unit load carrying ability of each sprag, due to the lack of removal of metal therefrom. There is also a highly desirable individualized energizing of the various sprags of the clutch which enables the same to best respond and maintain parallelism with the race axes as they go into and out of wedging engagement with the races.

What I claim as my invention is:

1. Retainer and biasing structure for a series of race-engaging sprags, comprising an annular member provided with circumferentially spaced apertures to receive the sprags radially, said member having axially spaced portions against which said sprags have bearing engagement in tilting into and out of wedging relation to the races, and spring tongue portions operatively connected to said axially spaced portions of said member and extending in a circumferential direction therefrom, said tongues having biasing engagement at the ends thereof with the respective sprags in radially spaced relation to the zones of bearing engagement of the spags with said member, said ends of said tongue portions being bent in a pronounced re-entrant shaped outline for additional resilience and having edge engagement with the respective sprags.

2. Retainer and biasing structure for a series of race-engaging sprags, comprising an annular member provided with circumferentially spaced apertures to receive the sprags radially, said member having axially spaced portions against which said sprags have bearing engagement in tilting into and out of wedging relation to the races and spring tongue portions operatively connected to said member and having biasing engagement with the respective sprags in radially spaced relation to the zones of bearing engagement of the sprags with said member, said tongue portions being bent in re-entrant U-shaped outline and including axially spaced leg formations at the U-bends thereof for additional resilience, said leg formations being connected by an edge portion having said biasing engagement with a sprag.

3. Retainer and biasing structure for a series of race-engaging sprags, comprising an annular member provided with circumferentially spaced apertures to receive the sprags radially, said member having axially spaced portions against which said sprags have bearing engagement in tilting into and out of wedging relation to the races, and spring tongue portions operatively connected to said member and having biasing engagement with the respective sprags in radially spaced relation to the zones of bearing engagement of the sprags with said member, said tongue portions being bent in re-entrant W-shaped outline and including axially spaced leg formations at the W-bends thereof for additional resilience, said leg formations being connected by an edge portion having said biasing engagement with a sprag.

4. Retainer and biasing structure for a series of race-engaging sprags, comprising an annular member of relatively thin spring metal provided with circumferentially spaced apertures to receive the sprags radially, said member having axially spaced portions against which said sprags have bearing engagement in tilting into and out of wedging relation to the races, and integral spring tongue portions on said member and having biasing engagement with the respective sprags in radially spaced relation to the zones of bearing engagement of the sprags with said member, said tongue portions being bent in re-entrant shaped outline and including axially spaced leg formations at the bends thereof for additional resilience, said leg formations being connected by an edge portion having said biasing engagement with a sprag.

References Cited by the Examiner
UNITED STATES PATENTS

| | | | |
|---|---|---|---|
| 2,820,537 | 1/1958 | Sauzedde | 192—45.1 |
| 2,940,567 | 6/1960 | Dodge | 192—45.1 |
| 3,055,472 | 9/1962 | Sauzedde | 192—45 |

DAVID J. WILLIAMOWSKY, *Primary Examiner.*